United States Patent [19]

Patil et al.

[11] Patent Number: 5,292,444
[45] Date of Patent: Mar. 8, 1994

[54] LUBE OIL COMPOSITIONS CONTAINING FULLERENE-GRAFTED POLYMERS

[75] Inventors: Abhimanyu O. Patil, Westfield; George W. Schriver, Somerville; Robert D. Lundberg, Bridgewater, all of N.J.

[73] Assignee: Exxon Research and Engineering Company, Florham Park, N.J.

[21] Appl. No.: 955,627

[22] Filed: Oct. 2, 1992

[51] Int. Cl.$^5$ .......................................... C10M 133/00
[52] U.S. Cl. ............................. 252/50; 252/51; 252/51.5 R; 252/51.5 A
[58] Field of Search ................ 252/50, 51.5 A, 51.5 R

[56] References Cited

U.S. PATENT DOCUMENTS

| | | | |
|---|---|---|---|
| 3,215,707 | 11/1965 | Rense | 548/546 |
| 3,231,587 | 1/1966 | Rense | 549/255 |
| 3,272,746 | 9/1966 | LeSueur | 252/47.5 |
| 3,275,554 | 9/1966 | Wagenaar | 252/50 |
| 3,361,673 | 1/1968 | Stuart | 252/51.5 A |
| 3,401,118 | 9/1968 | Benoit | 252/51.5 A |
| 3,438,757 | 4/1969 | Honnen | 44/335 |
| 3,442,808 | 5/1969 | Traise | 252/49.6 |
| 3,565,804 | 2/1971 | Honnen | 252/50 |
| 3,912,764 | 10/1975 | Palmer, Jr. | 549/255 |
| 4,000,353 | 12/1976 | Gardiner | 536/20 |
| 4,110,349 | 8/1978 | Cohen | 549/255 |
| 4,234,435 | 11/1980 | Meinhardt | 252/51.5 A |
| 4,820,432 | 4/1989 | Lundberg | 252/51.5 A |
| 4,828,742 | 5/1989 | Lundberg | 252/51.5 R |
| 4,839,073 | 6/1989 | Gutierrez | 252/51.5 A |
| 4,987,200 | 1/1991 | Datta | 526/75 |
| 5,030,370 | 7/1991 | Patil | 252/50 |
| 5,177,248 | 1/1993 | Chiang et al. | 560/86 |

OTHER PUBLICATIONS

Hirsch, et al., Angew. Chem. Int. Ed. Engl. 1991, 30, pp. 1309–1310, "Globetrotting Hydrogens on the Surface of the Fullerene Compound $C_{60}H_6(N(CH_2CH_2)_2O)_6$".

Wudl, et al., Am. Chem. Soc. Symp. 1991, pp. 161–175, "Survey of Chemical Reactivity of $C_{60}$".

Seshadri et al., Tetrahedron Letters, 1992, pp. 2069–2070, "Addition of Amines and Halogens to Fullerenes $C_{60}$ and $C_{70}$":.

Rao, et al., Indian. J. of Chem., May, 1992, vol. 31, A&B, pp. F27–F31, "Nitrogen Derivatives of $C_{60}$ and $C_{70}$".

Loy, et al., J. Am. Chem. Soc., 1992, pp. 3977–3978, "Synthesis of A $C_{60}$-Paraxylene Copolymer".

Datta et al., "Direct Polymerization to Functionalized Ethylene-Propylene Copolymers," Polymer Prep. Am. Chem. Soc., Div. Polymer Chem, 33, 899–900 (1992).

Primary Examiner—José Dees
Assistant Examiner—Dwayne C. Jones
Attorney, Agent, or Firm—Linda M. Scuorzo

[57] ABSTRACT

This invention relates to novel compositions of matter that are lube oils comprising an oil/hydrocarbon soluble fullerene grafted amine-containing polymers and a suitable base oil and, optionally other suitable additives for use as a lubricating oil. This invention also relates to the method of using the fullerene grafted amine-containing polymer itself as additives to base oils. The graft is made by reacting a fullerene with a primary or secondary amine-containing polymer, preferably hydrocarbon containing polymers. Suitable starting polymers are those containing primary or secondary amino groups, e.g., EPDM amine, PIB-amine, PIBSA-PAM, and Mannich based polymers. The lube oil compositions are made by adding an effective amount of the polymer, and optionally, other suitable additives to a base oil typically on an active ingredient basis of from about 0.01 to about 20 wt. %.

13 Claims, No Drawings

LUBE OIL COMPOSITIONS CONTAINING FULLERENE-GRAFTED POLYMERS

FIELD OF THE INVENTION

The present invention relates to certain lube oil compositions containing fullerene-grafted polymers.

SUMMARY OF THE INVENTION

The present invention relates to certain novel compositions of matter, lube oil compositions containing a suitable base oil and certain fullerene grafted amine-containing polymers as additives thereto. The lubricating oil compositions are made by combining a base oil and certain novel fullerene grafted amine-containing polymers, and optionally such other additives as are known to be suitable. The polymers themselves are made by grafting one or more fullerene molecules to reactive primary or secondary amino groups in preformed, i.e., prepolymerized polymers, preferably hydrocarbon or other oil soluble polymers, more preferably polyolefins, suitably EPDM-amine, PIB-amine, PIBSA-PAM and Mannich polymers, to form reaction products rather than simple mixtures of the starting materials.

Additionally, the fullerene grafted amine-containing polymers of the present invention will vary in the extent of chain extension with and among chains in the polymer depending on the mole ratio of fullerene molecules to amino groups in the starting polymer, with an excess of amino groups tending to produce a greater amount of chain extension than one in which the ratio is more nearly 1:1.

Amine-containing polymers are well known for their use in multifunctional lubricant additives; e.g., ashless lube and fuel dispersants, antioxidants and viscosity improvers ("VI"). Fullerenes, with their unique structures, may be used to modify the properties of these polymers. The resulting fullerene grafted amine-containing polymers may be used as lubricating oil additives and in combination with suitable base oils produce novel lube oil compositions of the present invention. They may be used as lubricating oil additives in essentially any application in which known lube oil compositions would be used.

DETAILED DESCRIPTION OF THE INVENTION

"Polymer," as used herein, means any homo, co-, ter-, or tetra-polymer. The term "polyolefin" means polymer derived by polymerization of an olefin (e.g., ethylene propylene diene monomer polymer, polyisobutylene).

The term "fullerene" means a class of all carbon containing molecules having an even number of carbon atoms arranged over the surface to form a closed hollow cage, typically a sphere or spheroid in the case of fullerenes such as $C_6$. Fullerenes are a class of all-carbon containing molecules which have an even number of carbon atoms arranged in the form of a closed hollow cage, typically a sphere or spheroid, in the case of the fullerenes. Each atom is linked to three nearest neighbors by bonds which define a polyhedral network. $C_{60}$ has the shape of a truncated icosahedron composed of 32 faces, of which 12 are pentagonal and 20 are hexagonal, a structure analogous to a soccerball. Suitably, $C_{60}$, $C_{70}$, $C_{76}$, $C_{78}$, $C_{84}$, $C_{120}$ and mixtures thereof may be used herein, although other fullerenes may also be used.

Partially substituted fullerenes also may be used, where the substituent is suitably any one or more that may be incorporated under conditions compatible with the present invention. As used herein, amino group substituents are preferred.

By "amine," "amino group," "amino-containing" and "aminosubstituted" is meant a primary or secondary amine or amino group that is available for bonding with or grafting to a fullerene under the conditions of the process of the present invention. The amino group(s) may be contained or isolated in one monomer of the polymer (e.g., ethylene propylene amine functionalized terpolymer) or may be present in a plurality of locations in the polymer (e.g., PIB-amine).

The terms "graft" and "bond," when applied to the attachment of the fullerene to the starting polymer, means the reaction of a fullerene with an preexisting or pre-synthesized polymer containing a reactive primary or secondary amino group. Concurrent incorporation of fullerenes into polymer chains during synthesis of the polymer is not included in the present invention.

The compositions of the present invention include the products produced by the processes disclosed herein.

The embodiments of the present invention may suitably comprise, consist or consist essentially of the elements disclosed; and any process may suitably be practiced, in the absence of any step(s) not specifically disclosed as required.

The various starting materials for making oil soluble fullerene grafted amine-containing polymers are as follows:

Fullerenes and Functionalized Fullerenes and Synthesis

Fullerenes are produced by high temperature reactions of elemental carbon or of carbon-containing species by processes known to those skilled in the art; for example, by laser vaporization of carbon, heating carbon in an electric arc and burning hydrocarbons in sooting flames. In each case, a carbonaceous deposit or soot is produced. From this soot, various fullerenes can be obtained by extraction with appropriate solvents, such as toluene. The primary constituent of a toluene-extracted soot usually is $C_{60}$, sometimes called Buckminsterfullerene. Lesser amounts of another fullerene, $C_{70}$, are formed along with traces of higher fullerenes, e.g., $C_{84}$, $C_{120}$. The exact composition of the extract varies with its method of preparation, but a typical composition is 80% $C_{60}$, 19% $C_{70}$ and 1% of many different higher fullerenes. The fullerenes can be separated by known methods, in particular by high performance liquid chromatography (HPLC); for example, as described in Kratschmer, Nature 1990, 347, 354–358, or from commercial sources. The polymer starting materials may be synthesized by art recognized procedures which are summarized herein. Other materials are available commercially.

The fullerene grafted amine-containing polymers suitable for use as lube oil additives in the present invention include those wherein the fullerene has been made to undergo further reactions at the fullerene functionality characteristic of fullerenes ("substituted fullerenes"), provided that the conditions required for those reactions are not incompatible with the presence of amines in the fullerene grafted amine-containing polymer and with the base oil and any other additives present in the lube oil composition. Such reactions of the fullerene grafted amine-containing polymers include those with additional ammonia or amine molecules, (i.e. small molecule amines, or polymeric amines/amine-containing polymers) e.g., to join together two or more polymers at the reactive amino group or groups of the fullerene grafted amine-containing polymer, increasing the molecular weight ("chain extended" polymer). The fullerene can also function as a bridging group to allow connection of molecules to a polymer which would not be connected in the absence of the fullerene. For example, small molecule amines such as alkylamines (e.g., n-propylamine) do not react with an amine-containing hydrocarbon polymer, but can add to a fullerene-grafted amine-containing hydrocarbon polymer at the fullerene. Additionally, the amine to be added to the fullerene-containing polymer can contain other functional groups, provided they are compatible with the process conditions of the present invention. For example, N,N-dimethyl-1,3-diaminopropane reacts with fullerene containing polymer products to give species where a tertiary amine has been attached to the polymer at the fullerene. A tertiary amine would react neither with the amine-containing polymer nor with a fullerene under similar conditions.

The fullerene grafted amine-containing polymers are made using a starting polymer that contains or is modified before addition of the fullerenes to contain at least one reactive amine (i.e., primary or secondary amino) group in order to provide a site for grafting the fullerene to produce the polymers of the present invention.

Amine Functionalized Polymers and Synthesis

Preferred starting polymers to produce compositions that are suitable for use as lube additives or in similar formulations requiring compatibility with another hydrocarbon, are naturally occurring or synthetic hydrocarbon-containing polymers, more preferably hydrocarbon or other oil soluble polymers, typically containing about at least 50 wt. % hydrocarbon content, most preferably hydrocarbon or other oil soluble olefinic polymers. For ethylene propylene polymers, preferred polymers are ethylene propylene norbornene terpolymers, ethylene propylene, ethylene butene-1, ethylene pentene-1, polyisobutylene, as they can be modified to contain the necessary reactive amino functionality, succinic anhydride polyamine ("PIBSA-PAM") and polyisobutylene amine ("PIB-amine").

Typically, introduction of the amine functionality to a polymer to make it suitable for grafting with a fullerene may be accomplished by several ways. For example, an amino-substituted polymer, such as amino-substituted ethylene propylene norbornene terpolymer can be prepared by copolymerizing ethylene (and, optionally, an alpha-olefin) with a masked nitrogen-containing monomer wherein the primary or secondary nitrogen group of the nitrogen-containing monomer is masked with an organometallic compound (preferably, a nonhalogenated organometallic compound), followed by deashing the resulting polymer product mixture to remove the organometallic compound and thereby form the amino-substituted polymer. The nitrogen containing monomer is suitably an unsaturated compound which is copolymerizable with olefins such as ethylene and propylene using a Ziegler catalyst. The nitrogen-containing monomer is masked prior to introduction into the polymerization; otherwise, an unmasked functionality would tend to react almost immediately with the Ziegler-Natta polymerization catalyst, thereby leading to a loss of activity. The masking reaction provides a chemical deactivation of the reactivity of the functional monomer. For procedures known to the art for forming ethylene propylene diene monomer amine, see, e.g., Datta, S.; Verstrate, G.; Kresge, E.N., Polym. Prepr., Am. Chem. Soc., Div. Polym. Chem., 1992, 33, 899–900; Datta, S.; Kresge, E.N., U.S. Pat. No. 4,987,200 (Exxon) for synthesis of EPDM-amine; Patil, A.O.; Datta, S.; Gardiner, J.B.; Lundberg, R.D., U.S. Pat. No. 5,030,370 (Exxon). Other amino substituted polymers can be prepared by halogenation of a polyolefin, e.g., chloro-PIB, bromo-PIB, followed by amination of the halogenated polyolefin by art recognized processes.

In compositions of the present invention which are to be used as hydrocarbon viscosity modifiers, the number of amino groups added to form the starting material must be controlled to maintain oil solubility. This readily may be accomplished by one skilled in the art with respect to the starting material based on art recognized procedures, and with respect to the ratios of amino groups to fullerenes, based on the teachings herein.

Suitable starting polymers to which the fullerenes may be grafted may be chosen from linear, block or random polymers provided that they otherwise have the required primary or secondary amino group(s) present and otherwise have the characteristics described herein. These polymers suitably will have a number average molecular weight (Mn) of equal to or greater than about 500. High Mn polymers may be used, however, constraints imposed by conventional polymer technology make handling difficult. More suitably, Mn is from about 500 to about 500,000, most suitably from about 5,000 to about 200,000 and a molecular weight distribution of from about 1.0 to 20, preferably 1.5 to 15. Small amines (also referred to herein as "small molecule amines") are not included in the starting polymers. The term "small amines" means amines and organic amines having a molecular weight (Mn) of less than or equal to 300 and/or equal to or less than 12 carbon atoms. Where the polymer is an ethylene propylene (EP) polymer, it will typically contain from about 20 wt. % to about 90 wt. % ethylene and the balance by total weight of from about 10 wt. % to about 80 wt. % propylene (or other olefins) and the termonomer containing the amino functionality. When other polyolefins such as PIB-amine or PIBSA/PAM amine are used, molecular weight of the hydrocarbon polymer is typically from Mn 500 to 5000.

The polymers used to make the fullerene grafted amine-containing polymers that are used as novel additives to base oils and to form the lube oil compositions of the present invention may be made, for example, as follows:

Amine-containing ethylene propylene polymers, such as EPDM-amine, can be prepared by the direct incorporation of masked, nitrogen-containing monomers (MNCM) into homopolymers and copolymers, such as polyolefins and particularly ethylene-propylene copolymers (EPM), to form copolymers, terpolymers and tetrapolymers containing the MNCM, as summarized herein. The nitrogen-containing monomer (NCM) is an unsaturated compound which is copolymerizable with polymer chain monomers (PCM), viz. olefins such as ethylene and propylene using a Ziegler catalyst. The term nitrogen-containing monomer (NCM) means the unsaturated, nitrogen-containing monomers which contain at least one primary amino and/or secondary amino group. Exemplary of nitrogen-containing monomers are norbornenyl-methyl amines and imines and preferably 5-norbornenyl-2-methylamine, 5-norbornene-2,3-dimethylamine, 5-norbornene-2-ethylamine.

The term masked, nitrogen-containing monomer (MNCM) refers to the reaction products formed by the reaction of the nitrogen-containing monomer and a metallic organic compound masking agent. The masked, nitrogen-containing monomer so formed is used as the actual comonomer in the polymerization process. The NCM is preferably masked in a reaction with non-halogenated metallic compounds such as organoaluminum compounds under controlled conditions and then contacted with suitable monomers for production of the amine-containing polymer.

The conventional monomers normally used in the production of these polymers, preferably ethylene and $C_3$-$C_{25}$ alpha-olefins, and mixed olefins may optionally contain a third type of monomer which is an easily polymerizable non-conjugated diene, suitably straight chain, hydrocarbon di-olefins or cycloalkenyl substituted alkenes, having about 6 to about 15 carbon atoms.

The polymerization process is performed in an otherwise conventional manner using suitable methods and catalysts known to be effective for such polymerization and can be carried out at any temperature and pressure suitable for Ziegler catalysis. The polymerization can be carried out in the presence of a molecular weight regulator such as hydrogen to produce an amino-substituted polymer having any particular desired molecular weight. The polymerization is quenched at the exit of the reactor by the introduction of suitable amounts of water, lower alkanol, or aqueous acid (e.g. aqueous HCl) as quench liquid. The desired amino functional group incorporated into the amino-substituted polymer as the masked functional group, can be regenerated by removal of the masking metal, through use of conventional de-ashing techniques, wherein the quenched polymerization products, containing masked-functionalized polymer, the polymerization catalysts, and unreacted monomers, are contacted with an aqueous liquid, e.g., water, aqueous solutions containing suitable mineral acids. The resulting hydrolysis reactions ("de-ashing") liberate the metal masking agent and generate the amino functional group, thereby forming the polymer. Further information on the formation of these polymers is found in U.S. Pat. No. 4,987,200, the disclosure of which is incorporated herein by reference.

Additional amine-containing polymers suitable for use as starting materials herein, PIBSA-PAM, PIB-amine, and Mannich polymers, are made as described in detail in U.S. Pat. No. 4,839,073, which disclosure is incorporated herein by reference, which is summarized as follows. Generally, the process involves contacting an amine compound having at least two reactive nitrogen moieties (amino groups) with at least one long chain hydrocarbon-substituted reactant in an amount and under conditions sufficient to form an amine-containing polymer adduct. The long chain hydrocarbon-substituted reactant will be at least one of: (i) long chain hydrocarbons substituted with mono- or dicarboxylic acid, anhydride or ester groups; (ii) halogenated long chain hydrocarbons; (iii) mixtures of formaldehyde and a long chain hydrocarbyl substituted phenol; and (iv) mixtures of formaldehyde and a reaction product formed by reaction of long chain hydrocarbons substituted with mono or dicarboxylic acid, anhydride or ester groups and an amino-substituted, optionally hydrocarbyl-substituted phenol.

The amine compounds will generally be at least one of ammonia, organic primary monoamines and organic polyamines containing at least one primary amine group or at least two secondary amine groups per molecule and may be hydrocarbyl amines or may be hydrocarbyl amines including other groups, e.g. ethylene diamine, propylene diamine, and diethylene triamine.

The long chain hydrocarbyl polymer-substituted reactant includes the reaction product of an effective amount as known in the art of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid; (ii) derivatives of (i) such anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxy group; and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid. Examples of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing.

The polyolefin for reaction with the monounsaturated carboxylic reactants are suitably homo- and copolymers comprising a major molar amount of $C_2$ to $C_{10}$, e.g., $C_2$ to $C_5$ monoolefin, including ethylene and propylene or ethylene and butene-1. The polymer can be reacted with the monounsaturated carboxylic reactant by a variety of art recognized methods, for example, by first halogenated the polymer to about 1 to 8 wt. % chlorine or bromine, based on the weight of polymer, then reacting the halogenated polymer with sufficient monounsaturated carboxylic reactant or by concurrently heating the polymer and monounsaturated carboxylic reactant while adding halogen for a time and at a temperature so the product obtained will contain the desired number of moles of the monounsaturated carboxylic reactant per mole of the halogenated polymer. Processes of these types are taught, for example, in U.S. Pat. Nos. 3,087,436 and 3,215,707, respectively.

Alternatively, the polymer and the monounsaturated carboxylic reactant can be contacted at elevated temperature to cause a thermal "ene" reaction to take place. In this process, the selected polymer and monounsaturated carboxylic reactant and halogen are contacted for a time and under conditions and amounts of reactants effective to form the desired polymer substituted mono- or dicarboxylic acid material. Thermal "ene" reactions have been described in U.S. Pat. Nos. 3,361,673 and 3,401,118, the disclosures of which are hereby incorporated by reference in their entirety. Optionally, a catalyst or promoter including alkoxides of Ti, Zr, V and Al, and nickel salts may be used as is commonly done in the art.

The amine compound(s) are reacted with the polymer substituted mono- or dicarboxylic acid material by heating optionally in an oil solution containing 5 to 95 wt. % of the polymer substituted dicarboxylic acid until the desired amount of water is removed, in a manner that favors formation of imides and/or amides, rather than salts.

Long chain hydrocarbyl reactants are halogenated long chain aliphatic hydrocarbons (as shown, e.g., in U.S. Pat. No. 3,275,554, the disclosure of which is hereby incorporated by reference) where the halogen group on the halogenated hydrocarbon is displaced with the nitrogen-containing compound in the subsequent reaction therewith. The amount of halogen introduced, as well as reaction conditions, may readily be determined by one skilled in the art, depending on the particular hydrocarbon used, the desired amount of amine to be introduced into the molecule, the particular alkylene amine used, and the halogen used.

Another class of long chain hydrocarbyl reactants suitable as starting polymers in the present invention are any of the long chain hydrocarbyl-substituted hydroxy aromatic compounds which are known in the art as useful for forming Mannich condensation products. Mannich condensation products generally are prepared by condensing about 1 mole of a high molecular weight hydrocarbyl substituted hydroxy aromatic compound (e.g., having a number average molecular weight of 500 or greater) with about 1 to 2.5 moles of an aldehyde such as formaldehyde or paraformaldehyde and about 0.5 to 2 moles of the second adduct, using the condensation conditions as disclosed, e.g., in U.S. Pat. Nos. 3,442,808; 3,649,229; and 3,798,165 (the disclosures which are hereby incorporated by reference in their entirety). Such Mannich condensation products may include a long chain, high molecular weight hydrocarbon on the phenol group or may be reacted with a compound containing such a hydrocarbon, e.g., polyalkenyl succinic anhydride as shown in said aforementioned U.S. Pat. No. 3,442,808.

Still another class of long chain hydrocarbyl reactants are the Mannich base aminophenol-type condensation products as they are known in the art. Such Mannich condensation products generally are prepared by reacting about 1 mole of long chain hydrocarbon substituted mono and dicarboxylic acids or their anhydrides (e.g., polyisobutylene-substituted succinic anhydride) with about 1 mole of amine substituted hydroxyaromatic compound (e.g., aminophenol), which aromatic compound can also be halogen- or hydrocarbyl-substituted, to from a long chain hydrocarbon substituted amide or imide-containing phenol intermediate adduct (generally having a number average molecular weight of 500 or greater), and condensing about a molar proportion of the long chain hydrocarbon substituted amide- or imide-containing phenol intermediate adduct with about 1 to 2.5 moles of formaldehyde and about 0.5 to 2 moles of the second adduct of this invention.

The preparation and use of the hydroxyaromatic compounds and amino-substituted hydroxyaromatic compounds, and methods useful for reaction thereof with an aldehyde and the selected amine compound are known in the art and are described in U.S. Pat. Nos. 4,820,432 and 4,828,742, the disclosures of which are hereby incorporated herein in their entirety.

The adducts formed by reaction of amines and long chain hydrocarbyl reactants to form the N-containing adducts described above will preferably have within their structure, on average, at least about 0.5 (e.g., from about 0.5 to 20) reactive amine groups per molecule.

Oil Soluble Fullerene Grafted Amine-Containing Polymers and Synthesis

The reaction between amino substituted polymer and fullerene produces fullerene grafted amine-containing polymers that may be used as additives to suitable base oils and that form, in combination with the base oil (and optionally suitable other additives) the compositions of the present invention. While not wishing to be bound by any particular theory or mechanism, the following features of the reaction are proposed.

If the aminated polymer starting material has only 1 reactive amino group per molecule, then the reaction between fullerene and this polymer may be carried out to form an adduct which is not crosslinked; i.e., the product will normally be soluble in a suitable solvent, preferably a hydrocarbon or oil solvent. However, if the fullerene grafted amine-containing polymer has multiple reactive amino groups per polymer molecule then the reaction with fullerene has the potential to produce a crosslinked (i.e., insoluble product) if the reaction conversion is sufficiently high. It is, therefore, important to control the reaction and monitor product formation to select only those fullerene grafted amine-containing polymers that have a suitable degree of solubility in the chosen base oil. One skilled in the art can establish the appropriate parameters to produce a product which is substantially hydrocarbon (i.e. base oil soluble) soluble as opposed to one which is highly crosslinked, given the teachings herein, by selecting the appropriate ratio of amino groups to fullerenes and by analyzing the resulting compositions by known techniques for measuring solubility. As an example, a sample of EPDM-amine which contains on the average of only one amine per polymer molecule will react with fullerene to yield a composition that is substantially soluble in common solvents such as the base oils disclosed herein known to those skilled in the art, even at high reaction conversions because the capability of each polymer molecule to react with all other molecules through the fullerene is low.

If however, there are multiple reactive amino groups per polymer molecule, the probability of fullerene reacting with more than one molecule increases. As the extent of reaction is increased to convert more of the unreacted amines to fullerene adducts, the solubility of the product will be reduced since a network will be formed rendering it unsuitable in the present invention. Thus a crosslinked polymer composition will result at high conversion. If the polymer number average molecular weight is high (at least about 100,000) and contains many reactive amine groups per polymer molecule (e.g., at least about 10) are present, crosslinking will be facile. In such cases, crosslinking may still be minimized by employing an excess of fullerene, based on the number of reactive amino groups present. A ratio of greater than about 5:1 should typically be sufficient to limit the extent of crosslinking to an amount suitable to use the composition as an additive as disclosed herein.

If the polymer number average molecular weight is low (below about 5000) the probability of crosslinking is markedly reduced even with multiple reactive amines per polymer chain. In situations where the polymer is not substituted to the same degree with amino groups, the reaction with fullerene can give rise to a product which is partially soluble in the chosen solvent. The fraction of composition which is soluble is referred to as per cent soluble, and is measured in suitable solvents as known to those skilled in the art for the polymer. In the case of EPDM-amine a suitable solvent is xylene.

While the preceding discussion is directed to high molecular weight polymers which possess varying levels of reactive amino groups randomly distributed along the polymer chain (as with EPDM-amine), the situation is different with polymeric systems such as PIB-amine or PIBSA-PAM dispersants, which are typically synthesized to produce a localized concentration of amino groups connected to a moderately high molecular weight polyisobutylene. Under these conditions, there can be multiple reactions of the amino functionality with a single fullerene molecule, but lowered probability of polymer-polymer reactions. These compositions typically have a higher level of solubility and most often are completely soluble and thus are more desirable for use as additives for base oils and in combination therewith to form lube oil compositions.

The soluble fullerene grafted amine-containing polymers can be further characterized in solution by measuring the viscosity contribution to standard solution. This measurement is a direct measure of the hydrodynamic volume of the novel fullerene grafted amine-containing polymer. A convenient and widely employed viscometric technique involves dissolution of the soluble adduct in a suitable solvent at about 1 gram per deciliter, followed by measurement of the viscosity of the polymer solution. The Reduced Viscosity (Red. Vis.) is then defined as:

$$\text{Red. Vis.} = \frac{\eta soln - \eta o}{\eta o\, C}$$

where $\eta soln$ is viscosity of the solution; $\eta o$ is viscosity of the solvent; C is polymer concentration in grams/deciliter When these measurements are conducted at different polymer concentrations, the extrapolated value of Reduced Viscosity at zero concentration is a directly and commonly used measure of the hydrodynamic volume of the polymer, the Intrinsic Viscosity.

Fullerene grafted amine-containing polymer adducts typically possess a higher value of the Reduced Viscosity and the Intrinsic Viscosity than the starting polymer. Such results are shown in Table 1.

| Reduced Viscosity Vs. Concentration in Xylene for EPDM-NH$_2$ and C$_{60}$-Grafted EPDM amine | | |
|---|---|---|
| Polymer | Conc. g/100 cc | Reduced Viscosity |
| EPDM amine | 0.122 | 0.913 |
|  | 0.244 | 0.961 |
|  | 0.49 | 1.07 |
|  | 0.974 | 1.30 |
| EPDM amine/ C$_{60}$ | 0.116 | 1.19 |
|  | 0.232 | 1.28 |
|  | 0.46 | 1.46 |
|  | 0.926 | 1.84 |

Optionally, the unsubstituted fullerene or pendant substituted fullerene grafted amine-containing polymer may be reacted with second small primary-tertiary diamines, for example, N,N-dimethylaminopropylamine or N-aminopropylmorpholine, to obtain novel multiarm amine-functionalized polymers. In these types of reactions, the primary amine portion will react, but not the tertiary amine. Since there is more than one reactive site for such amines on the fullerene, this invention includes the addition of several of such compounds to the fullerene grafted amine-containing polymers.

More specifically, the fullerene-containing graft polymer is the reaction product of a fullerene and an amine-containing polymer. The graft is made by combining an effective amount of a polymer containing a primary or secondary amino group or mixtures thereof and a fullerene; and reacting the polymer and fullerene for a time and under conditions sufficient to form a fullerene-grafted polymer. The mixture should be such that the polymer is in suitable form to facilitate molecular mixing or contact; e.g., by dissolution in a suitable solvent or neat where polymer is liquid, or by applying heat or other external means for fluidizing where the polymer is solid or semisolid. A fullerene grafted amine-containing polymer is thus formed by graft reaction such that the fullerene bonded onto the nitrogen of the primary or secondary amino group of the polymer thus:

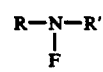

wherein at least one of R and R' is a hydrocarbon or oil (e.g. base oil) soluble polymer unit, described elsewhere in the specification, of the polymer R-N-R', and wherein when R or R' is not a polymer unit it is selected from the group consisting of H and hydrocarbon or oil (e.g. base oil) soluble alkyls, typically $C_1-C_{20}$, which alkyls may be functionalized so long as functionality does not inhibit the unit's solubility in oil or other hydrocarbons and hence its use as an additive for base oils, wherein F is a fullerene or substituted fullerene, N is a reactive amino group of the polymer. Where oil solubility is required herein it is sufficient that the unit or group be either oil soluble or capable of being rendered oil soluble under the conditions and for the uses disclosed herein. Where the polymer unit contains more than one amino group, fullerene grafts may occur either by crosslinking or chain extension. However, in the present invention, highly crosslinked materials are not desirable due to their generally decreasing solubility in oil and other hydrocarbons which are typically used as the base oil for lube oil compositions. An undesirable degree of crosslinking may be limited as described above.

Optionally, so long as the resulting material is oil soluble, the fullerene-grafted amine-containing polymer may be reacted with an effective amount of a second amine wherein the second amine may be a small amine (Mn less than about 300) or a polymeric amine/amine-containing polymer for a time and under conditions sufficient to produce at least one substituted amino group on the fullerene. Additionally, the fullerene grafted amine-containing polymer, either unsubstituted or partially substituted at the fullerene may be further reacted with an amino group containing unit so long as oil/hydrocarbon solubility is maintained. Suitable reaction conditions are as already described in reaction of fullerenes with polymers.

It is equally appropriate to react the fullerene first with a small amine to partially functionalize (aminate) using procedures known in the art to functionalize the fullerene with a small amine and then react the partially functionalized fullerene with a (primary or secondary) amine containing polymer of the types described herein.

In order to graft fullerenes onto the polymer, both must be present in a form or medium that will produce sufficient contact and molecular mixing sufficient to carry out the reaction. This may be accomplished by dissolving the fullerenes in a suitable solvent, e.g., methylene chloride, chloroform or preferably toluene or benzene for $C_{60}$ and $C_{70}$, or by adding the fullerenes neat, provided that the starting polymer is in a suitable form, condition, phase or medium to allow contact without altering its essential properties, e.g., by dissolving the polymer in a suitable solvent, heating to fluidity, extruding. It is within the skill of one ordinarily skilled in the art to select the appropriate means and/or media for facilitating the contact and reaction between the fullerenes and polymer. Suitable solvents for the fullerenes are toluene, xylene, benzene, chloroform. Other suitable solvents for dissolving polymer and carrying out the reaction, e.g., heptane, THF, mineral oil, may be used, although the fullerenes do not dissolve therein. For commercial purposes, use of the process in the absence of solvent is desirable.

The reaction should be carried out at a temperature sufficient to facilitate the grafting reaction, e.g., with suitable mixing or stirring. Suitably, 0° C. to the lower of the refluxing temperature of the solvent or the temperature at which the amino groups of the polymer decompose should be used; however, more mild temperature conditions may be used, typically from about 20° C. to about 100° C., provided in all cases that the polymer can be maintained in a suitably fluid form within the range. Suitably, the reaction may be carried out at pressures from about 0 kpa to about 3000 kpa. More severe conditions may be used to accelerate the reaction. The reaction time is generally from about 15 min. to about 1 week.

Varying degrees of grafting of the fullerenes to the polymer backbone can occur. Generally, a mole ratio of reactive amine in polymer to fullerene molecules of from about 1:10 or greater than 10 generally produces grafting; 10:1 or greater than 10:1 give crosslinking or chain extension. Intermediate ratios such as 1:1 give results that depend on the nature of the particular polymer employed.

Grafting of the fullerene functionality is evidenced by physical changes (such as change in color) in the polymer and/or fullerene solution, formation of a soluble material, particularly if one of the starting materials was insoluble, change in viscosity (or intrinsic viscosity) or change in spectrometric properties of the fullerene grafted amine-containing polymer as compared to that of the original polymer. The nature and extent of the change(s) depends in part on the ratio of the starting reagents employed. Thus, for example, EPDM-amine is a colorless polymer, soluble in THF or heptane and $C_{60}$ is a purple solid, insoluble in heptane. When reacted in a mole ratio of about 5:1, a reddish brown product, soluble in THF or heptane, formed. In these cases, nearly complete reaction of the fullerene and polymer is evident from the infrared spectrum of the product. The characteristic IR bands of $C_{60}$ at 527 and 578 $cm^{-1}$ disappear in the reaction product. Likewise, a broader peak at 615 $cm^{-1}$ due to the unfunctionalized polymer disappears upon reaction. If other polymers or fullerene are used, suitable detection that takes into account their properties may suitably be selected by those skilled in the art.

Additional physical measurements evidencing the reaction between the fullerenes and polymer can be provided by viscometric studies using known techniques. For example, for an EPDM-amine $C_{60}$ graft polymer the reduced viscosity-concentration profiles of the starting EPDM-amine polymer compared with that for the fullerene grafted amine-containing polymer reaction product as measured in xylene at 30° C. showed about 4% of the product was insoluble in xylene, presumably due to crosslinking. Reduced viscosity provides a measure of the hydrodynamic volume (and, generally Mn) of the polymers, which increased in the value for the fullerene grafted polymer reaction product as compared to the starting EPDM-amine (i.e., the intercepts of the lines correlating reduced viscosity with concentration or intrinsic viscosities are substantially different), thus showing that the functionalized polymer is not a simple mixture or complex of $C_{60}$ and EPDM-amine. The increase in reduced viscosity (or intrinsic viscosity) is a consequence of more than one EPDM-amine reacting with some of the fullerene molecules.

The fullerene grafted amine-containing polymer can be reacted with another amine-containing polymer to link polymers together. For example, EPDM-amine reacted with $C_{60}$ may be reacted with another EPDM-amine polymer. Alternatively, EPDM amine reacted with $C_{60}$ may be reacted with PIBSA-PAM or PIB-amine under the conditions described above.

Grafting of the fullerene functionality is also desirable because $C_{60}$ may be used to provide sites for further functionalization, including functionalization by methods which would fail for the original polymer.

The fullerene grafted amine-containing polymer may be isolated by means known to one skilled in the art, e.g., using known or measurable solubility properties. Thus, fullerenes are insoluble in many solvents, such as heptane, in which the starting polymer materials, particularly hydrocarbon polymers and their fullerene grafted derivatives are soluble. Dissolution of the reaction product in such a solvent and filtration may be employed to leave behind unreacted fullerene as an insoluble residue. The fullerene-grafted polymer may then be recovered by evaporation of the solvent or precipitation, accomplished by addition of a solvent in which the product is insoluble, commonly acetone. This process will also remove small amounts of insoluble crosslinked material.

Novel Lube Oil Compositions and Methods of Using Oil Soluble Fullerene Grafted Amine-Containing Polymers as Additives to Base Oils The present invention includes a method of using oil soluble fullerene grafted amine-containing polymers as additives to base oils by adding an effective amount of the polymer to a suitable base oil.

The present invention also includes lube oil compositions which comprise an effective amount of an oil or hydrocarbon soluble fullerene grafted amine-containing polymer and a suitable base oil.

Conventional methods well known in the art may be used to incorporate the fullerene-grafted amine-containing polymer additive into the base oil, and to make the lube oil composition. The general requirements for and characteristics of lube oils, base oil components and other art-recognized additives and the methods of making and using them are described in detail in U.S. Pat. No. 5,030,370, which disclosure is incorporated herein by reference.

The suitable polymers and fullerenes and fullerene grafted amine-containing polymers made therefrom have been described above as if set forth in full herein.

In the present invention, oil or hydrocarbon soluble fullerene grafted amine containing polymers can be used as additives by incorporating them in a minor amount into a major amount of a lubricating oil, e.g., by being added directly to the lubricating oil by dispersing or dissolving the same in the lubricating oil or suitable carrier fluid at the desired level of concentration of the viscosity index improver dispersant, at room temperature or elevated temperatures, or by blending with a suitable oil-soluble solvent/ diluent (such as benzene, xylene, toluene, lubricating base oils and petroleum distillates, including the various normally liquid fuels using methods known to those skilled in the art to form a concentrate, and then blending the concentrate with a lubricating oil) to obtain the final formulation. Such additive concentrates will typically contain (on an active ingredient (A.I.) basis) from about 0.01 to about 20 wt. %, more preferably from about 0.05 wt. % to about 10 wt. % and most preferably from about 0.25 to about 3 wt. %, of the additives of the present invention, with the balance comprising base oil.

The additives of the present invention have utility in lubricating oil compositions which employ a base oil in which the additives are added directly or dissolved or dispersed in a carrier fluid in effective amounts. Base oils suitable for use in preparing the lubricating oil compositions of the present invention include natural and synthetic oils well known in the art, e.g., crankcase lubricating oils spark-ignited and compression-ignited internal combustion engines, power transmitting fluids, hydraulic fluids, and power steering fluids.

These lubricating oil formulations of the present invention (comprising the fullerene grafted amine-containing polymers and suitable base oil) conventionally also may contain several different types of additives well known to those skilled in the art to supply the characteristics required in the formulations, including viscosity index improvers, other V.I. improver dispersants, antioxidants, corrosion inhibitors, detergents, ashless dispersants, pour point depressants, antiwear agents, friction modifiers. The novel fullerene grafted amine-containing polymer compositions may also be used in conjunction with one or more of these additives.

The additives may be utilized in a concentrate form, e.g., from about 5 wt. % up to about 50 wt. %, preferably 7 to 25 wt. % in oil, e.g., mineral lubricating oil, for ease of handling.

The additives will be generally used in admixture with a lube oil basestock comprising an oil of lubricating viscosity, including natural and synthetic lubricating oils and mixtures thereof. Natural oils include animal oils, vegetable oils, liquid petroleum oils and hydrorefined, solvent-treated or acid-treated mineral lubricating oils of the paraffinic, naphthenic and mixed paraffinicnaphthenic types and oils of lubricating viscosity derived from coal or shale, and appropriate derivatives modified as known in the art. Unrefined, refined and rerefined oils known to those skilled in the art can be used in the lubricants of the present invention.

Compositions when containing these conventional additives are typically blended into the base oil in amounts effective to provide their normal attendant function in such amounts as are commonly known to those skilled in the art. Such amounts are, for example, those disclosed in U.S. Pat. No. 5,088,788, which is incorporated herein by reference.

What is claimed is:

1. A lube oil composition comprising a base oil and an effective dispersant, antioxidant, and viscosity improving amount of a hydrocarbon soluble reaction product of a fullerene and a hydrocarbon containing polymer having at least one reactive amino group selected from the group consisting of primary amino groups, secondary amino groups, and mixtures thereof.

2. The composition of claim 1 wherein the fullerene is selected from the group consisting Of $C_{60}$, $C_{70}$, $C_{76}$, $C_{78}$, $C_{84}$, $C_{120}$ and mixtures thereof.

3. The composition of claim 1 wherein the hydrocarbon polymer has the formula:

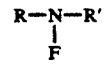

wherein F is a fullerene, and wherein at least one of R and R' is a polymer unit of the polymer R-N-R' having solubility in hydrocarbons, and wherein when R or R' is not a polymer unit, the R or R' is selected from the group consisting of H and hydrocarbon soluble alkyls.

4. A lube oil composition comprising a base oil and an effective dispersant, antioxidant, and viscosity improving amount of hydrocarbon soluble reaction product of
a fullerene and
the reaction product of a long chain hydrocarbyl substituted mono- or dicarboxylic acid or its anhydride, said long chain hydrocarbyl having a number average molecular weight of from about 500 to about 10,000 MW, and a polymer containing at least 2 reactive amino groups selected from the group consisting of primary amino groups, secondary amino groups, and mixtures thereof, wherein the reaction product contains at least one reactive amino group selected from the group consisting of primary and secondary amino groups.

5. The composition of claim 4 wherein the long chain hydrocarbyl is an ethylene alpha-olefin copolymer.

6. The composition of claim 4 wherein the dicarboxylic acid is selected from the group consisting of maleic acid, fumaric acid, chloromaleic acid, acrylic acid, methylacrylic acid and crotonic acid.

7. A polymeric composition, comprising a base oil and an effective dispersant, antioxidant, and viscosity improving amount of hydrocarbon soluble reaction product of
a fullerene and
the reaction product of at least one alkyl substituted hydroxyaromatic compound formed by the alkylation of a hydroxy aromatic compound with an olefin polymer of a $C_2$ to $C_{10}$ monoolefin having a number average molecular weight of from about 500 to about 10,000, an aldehyde reactant and at least one amine having at least two reactive amino groups selected from the group consisting of primary amines, secondary amines and mixtures thereof.

8. The composition of claim 7 wherein the aldehyde reactant is selected from the group consisting of formaldehyde and paraformaldehyde.

9. A lube oil composition, which comprises a base oil and an effective dispersant, antioxidant, and viscosity improving amount of a hydrocarbon soluble reaction product of
a fullerene and
an amine-containing polymer having at least one reactive amino group selected from the group consisting of primary amines, secondary amines and mixtures thereof, said polymer formed by the process of polymerizing ethylene with an alpha-olefin and an organometallic compound-masked nitrogen-containing monomer, followed by deashing to remove the organometallic compound.

10. The composition of claim 9 wherein the amine-containing polymer contains from about 20 wt. % to about 90 wt. % ethylene and from about 80 wt. % to about 10 wt. % propylene by total weight.

11. A lube oil composition comprising a base oil and a hydrocarbon soluble reaction product of a fullerene and an amine-containing polymer formed by reacting an amine compound with a halogenated polymer selected from the group consisting of bromopolyisobutylene and chloropolyisobutylene.

12. A lubricating oil composition comprising a base oil and from about 0.1 wt. % to about 20 wt. % of an oil soluble fullerene grafted amine-containing polymer.

13. A method of using fullerene grafted amine-containing polymers as a lube additive comprising adding an effective amount of an oil soluble fullerene grafted amine-containing polymer to a base oil.

* * * * *